United States Patent Office 2,925,346
Patented Feb. 16, 1960

2,925,346

GETTERING OF VACUUM PACKAGES

Robert H. Harper, Park Forest, Ill., and Robert W. Kittle, Tonawanda, N.Y., assignors to Swift & Company, Chicago, Ill., a corporation of Illinois No Drawing. Application August 12, 1957
Serial No. 677,767

6 Claims. (Cl. 99—174)

This invention relates to the packaging of meat products and more particularly, to a method of forming an hermetically sealed package of meat product having an improved appearance and keeping qualities.

Vacuum packaging of foods in flexible transparent wrappers has developed into a highly specialized art. Advantages to be realized from such packaging include an improved retention of color, flavor, and other properties. Moreover, there is an advantage in merchandising since products so packaged are readily visible to potential consumers. Because of the fact that the product is clearly visible in the package, food processors marketing their products in this fashion are constantly alert for new methods by which they may produce attractive packages which show the product in a more appetizing and favorable manner. Packages formed from flexible transparent films may either be under reduced pressure or may contain an inert gas under a slightly positive pressure or substantially at atmospheric pressure. Vacuum packaging in a transparent, gas impermeable, flexible wrapper is illustrated in Patent No. 2,621,129 to John M. Ramsbottom et al. The use of an inert gas in backfilling a flexible, gas impermeable container is illustrated in Patent No. 2,623,826, to Sanford R. Grinstead.

It has now become common practice in the meat industry to merchandise table-ready meats in the form of hermetically sealed packages containing several slices of product enclosed in a gas impermeable wrapper. Typical meat products which are merchandised in this fashion include such cured meats as bologna, pickle and pimento loaf, sliced ham, thuringer, and a wide variety of other cured meat products. It is most important, because the product is continuously on display in the transparent package, that the product retain an attractive color and generally desirable appearance. In addition, these characteristics should be maintained over a reasonable period of time, resulting in a product having a good shelf life. Color is one of the more important factors in providing an attractive product, and therefore, any method by which the quality of color is improved or the length of time of color retention is increased is greatly to be desired. This is particularly so in the case of cured meat products which have a desirable pink color when freshly cured and a grayish or brownish coloration after exposure to gaseous oxygen for a period of time.

It is, therefore, an object of this invention to provide an improved method of packaging meat products wherein the keeping qualities and desirable color qualities of the product are maintained at a high level.

Another object of the invention is to provide a package of cured meat product having a desirable cured meat color stabilized against deterioration of said color.

Still another object of this invention is the provision of a method for packaging cured meats having a desirable cured meat color which is stable over a longer period of time than has been possible heretofore.

In accordance with the present invention, cured meat having a desirable fixed pink color is hermetically packaged in a container, and the packaged product is protected against the adverse effect which oxygen would have on the cured color of the meat product by the presence within the package of a substance which acts as an oxygen "getter" and color brightener. A "getter" as this term has been used in connection with the vacuum tube art is a substance which cleans gases such as oxygen from a given area. The "getter" may react with uncombined oxygen present within the area, and thereby remove the oxygen or the oxygen may be absorbed by the "getter." As used in this description, "getter" is intended to denote the material such as nitric oxide which combines with uncombined oxygen within an area such as the interior of a package and renders the oxygen innocuous.

In the production of cured meats, the primary objective is to convert the natural occurring heme pigments, hemoglobin and myoglobin, to nitric oxide hemoglobin and nitric oxide myoglobin, and to avoid the production of the undesirable grayish or brownish methemoglobin and metmyoglobin pigments. Conventional curing processes such as those well known in the art involve the use of nitrate and nitrite salts and require a substantial period of time before the cured color develops since the production of the curing agent is dependent upon the activity of certain bacteria present in the meat. There is disclosed in U.S. application Serial No. 644,793, filed March 8, 1957, wherein the inventor is Robert H. Harper, a method for the quick curing of meat. In accordance with this method, a stable cured color is developed in the meat by the use of gaseous nitric oxide as the curing agent in a much shorter period of time than had previously been considered possible. All of the meat products which could be cured by prior art methods may also be cured in this manner.

Although it is possible to obtain, by the method set forth in the aforementioned patent application, cured meat products having a higher degree of cure than has been possible heretofore in a much shorter time than has been possible heretofore, the problem with respect to stabilization of this brilliant cured color in a transparent package has not, as far as we are aware, been solved. Since oxygen reacts with the pigments which give the cured color to meat, forming gray or grayish-brown methemoglobin and metmyoglobin pigments, it is most desirable to keep the cured meat out of the presence of uncombined oxygen, and this is particularly so when large surface areas of the cured product such as are present in slices of product are concerned. The method disclosed herein presents substantial advantages over the vacuum packaging and inert gas packaging suggested by others in the art.

Specifically, the method of the present invention involves the packaging of a cured meat product within an atmosphere having a small amount of available nitric oxide. In one embodiment of the method, slices of a cured product such as ham or bologna, for example, are placed in a transparent pliable, flexible container, and oxygen is removed from the container by vacuumization to about 29 inches Hg. The package is then backfilled with an amount of nitric oxide to decrease the vacuum by about 2 inches Hg and sealed. A bright and stable colored product is produced by this method and the package of meat product produced by this method is far superior both with respect to the brilliance of the color and the stabilitly of the brilliant color to products which are simply vacuum packaged, and also to those which are packaged in accordance with the technique involving backfilling with inert gas.

In the examples which follow, the advantages of this invention are illustrated by a comparison of packages prepared in accordance with this invention with those prepared by prior art methods.

EXAMPLE I

Vacuumized packages of sliced thuringer, ham and bologna, which had been stored for a period of time, were opened and the slices in each package were divided into two samples, one sample to be used as a control and the other to be treated in accordance with the method of this invention. The control sample was placed in an envelope of a gas-impermeable, flexible film. The package was vacuumized to 29" Hg in a vacuum chamber. This vacuumization results in substantially complete removal of air or other gases contained in the package or in the pores of the product. The vacuum chamber is then connected to a source of oxygen-free nitrogen and backfilled with an amount of nitrogen to decrease the vacuum by about 2" Hg. When the desired degree of partial vacuum is obtained, the package is sealed.

Packages treated by the method of this invention are handled substantially in accordance with the procedure set forth for the control packages except that nitric oxide rather than nitrogen is employed as the backfilling gas. The packaged products, both controls and treated samples, were then held under a source of light rated at 35 foot-candles, which is comparable to the amount of light which packages are exposed to in the usual display case. The following table shows the color evaluation of each of the samples after exposure of the samples to the light source for varying periods of time.

Table 1

| Product | Time of Exposure (Hrs.) | | | | | | |
|---|---|---|---|---|---|---|---|
| | 0 | 1 | 2 | 3 | 4 | 5 | 6 |
| Thuringer, Control | 9 | 8 | 7 | 7 | 7 | 7 | 6 |
| Thuringer, Test | 9 | 8 | 8 | 8 | 8 | 8 | 8 |
| Ham, Control | 10 | 10 | 9 | 8 | 7 | 7 | ¹7 |
| Ham, Test | 10 | 10 | 10 | 10 | 10 | 10 | 10 |
| Bologna, Control | 10 | 10 | 9 | 8 | 7 | 6 | 6 |
| Bologna, Test | 10 | 10 | 9 | 8 | 8 | 7 | 7 |

¹ Brown.

The color ratings set forth in this example and other examples which follow are arrived at by averaging the evaluations of a panel of 5 members. A rating of 10 is as near a completely cured color as can be judged visually and is seldom given by a panel of experts acquainted with cured meats. A conventional cured bologna, for example, will have an initial rating of 8 and, on rare occasions, a rating of 9 before exposure to light. Many cured meat products sold in meat markets are rated about 6, this being the minimum acceptable rating for a cured product. A rating of 4 would be described as a dull gray with a slight pink undercast. The color rating of 5 is generally considered poor, and, of course, any rating as low as 1 would be representative of a product which is repulsive.

EXAMPLE II

Sliced ham and sliced bologna were treated substantially in accordance with the method set out in Example I, and the treated samples were exposed to normal showcase lighting conditions for 10 hours. After a 10-hour exposure period, the control sample had faded considerably in each case while the treated sample retained a desirable bright color. In Table 2 which follows, the color evaluations of each sample are set forth.

Table 2

| Product | Time of Exposure (Hrs.) | |
|---|---|---|
| | 0 | 10 |
| Bologna, Control | 9 | 5 |
| Bologna, Test | 9 | 8 |
| Ham, Control | 10 | 4 |
| Ham, Test | 10 | 10 |

EXAMPLE III

As an alternative to the use of vacuum as a means for removing oxygen from the package, sliced bologna enveloped in an oxygen-impermeable film such as Saran was subjected to the sweeping action of a stream of oxygen-free gaseous nitrogen. After about 30 seconds' exposure of the interior of the package to the stream of nitrogen, nitric oxide equivalent to about one inch Hg backfill was introduced. The substantially oxygen-free package containing a small amount of nitric oxide was sealed and the package was then exposed to a light source in a manner similar to that set forth in Example I above. After some six hours exposure time, there was no apparent fading in the desirable bright color of the sample.

A variation on the foregoing procedure involves vacuumizing the package after it is swept with nitrogen and then partially backfilling with a small amount equivalent of nitric oxide before sealing. An additional alternative which may be employed is sweeping the package with oxygen-free gaseous nitrogen containing a small amount of nitric oxide. The proper amount of nitric oxide containing nitrogen which should be added to the package is easily determinable by the disappearance of traces of brown color typical of nitrogen dioxide which are present within the package as a result of uncombined oxygen. In accordance with this embodiment of the procedure, the point at which further sweeping with nitrogen containing nitric oxide may be terminated is that at which no further nitrogen dioxide as evidenced by the aforementioned color is present.

It can be seen that in some cases the packages which result will be substantially at atmospheric pressure, whereas in other cases the packages will be under sub-atmospheric pressure or at a slight positive pressure.

In order to clearly demonstrate that the effect provided by the presence of available nitric oxide within the package is one of gettering and rather than merely attaining a higher degree of cured pigment, the following test was conducted. Two packages of sliced bologna having one end of the package open were placed in a vacuum chamber. The chamber was vacuumized and back filled with nitric oxide. The packages were held in the nitric oxide atmosphere for about 60 seconds. One of the packages was then removed from the chamber in an unsealed condition so that it became exposed to air. This package was then vacuumized and sealed in accordance with conventional processing procedures. The other sample which remained in the vacuum chamber was vacuumized without exposure to oxygen and the package was then sealed. A comparison of the two samples showed that the sample which had been exposed to oxygen had very poor color retention while that which was held in the vacuum chamber between the nitric oxide and vacuumization steps showed a superior color, much better than that which had been exposed to the air, but somewhat less attractive than those samples containing a residual amount of nitric oxide.

The material from which flexible containers used in this process is made must be impervious to air and includes such well-known packaging materials as Saran, which is a trademark for a co-polymer of vinyl chloride and vinylidene chloride, Mylar, which is a trademark for a polymethylene terephthalate film, as well as cellophane and laminates of these plastic films with each other or with other materials. These materials can be sealed by any acceptable method.

Of course, cured meat products packaged in containers other than flexible film may be treated in accordance with the method of this invention, since the basis of the invention lies in insuring that a residual amount of nitric oxide be retained within the area containing the cured meat product, the amount of residual nitric oxide being slightly in excess of that required to react with any uncombined oxygen present in the area. Products packaged in metal cans, glass containers or plastic lined fibre board containers, for instance, can be treated by the herein disclosed method.

Obviously many modifications and variations of the invention as hereinbefore set forth may be made without departing from the spirit and scope thereof, and therefore only such limitations should be imposed as are indicated in the appended claims.

We claim:

1. A process of packaging cured meat products to provide an attractive, bright colored product and inhibit color degradation in said product which comprises: placing the product in a container, removing oxygen from the product and container, backfilling the container with a gaseous oxide of nitrogen, and thereafter sealing said container.

2. A process of packaging cured meat products to provide an attractive, bright colored product and inhibit color degradation in said product which comprises: placing the product in a container, subjecting the product and the container to a high vacuum to remove oxygen from said product and said container, backfilling said container with nitric oxide to a lower degree of partial vacuum and thereafter sealing said container while it is subjected to said partial vacuum.

3. A process of packaging cured meat products to provide an attractive, bright colored product and inhibit color degradation in said product which comprises: placing the product in a container, sweeping said container and product with nitrogen to substantially remove oxygen therefrom, subjecting said substantially oxygen-free container and product to a partial vacuum, backfilling said container with nitric oxide to a lower degree of partial vacuum, and thereafter sealing said container to provide a package having a small amount of available nitric oxide.

4. A process of packaging cured meat products to provide an attractive, bright colored product and inhibit color degradation in said product which comprises: placing the product in a container, sweeping said container and said product with gaseous nitrogen to substantially remove oxygen from said container, adding a small amount of nitric oxide to said container, and thereafter sealing said container to provide a package which is substantially at atmospheric pressure.

5. A process of packaging cured meat products to provide an attractive, bright colored product and inhibit color degradation in said product which comprises: placing the product in a container, subjecting the product and the container to a source of gaseous nitrogen containing a small amount of nitric oxide, and thereafter sealing said container to provide a package which is substantially at atmospheric pressure.

6. A process of packaging cured meat products to provide a stable cured color in the meat and protect said meat product against oxygen comprising: placing the product in a container, sweeping the product and container with gaseous nitrogen containing a small amount of nitric oxide to remove oxygen from said container, and hermetically sealing said container whereby to provide a small amount of residual nitric oxide within said container.

References Cited in the file of this patent

UNITED STATES PATENTS

| 1,017,144 | Gironcoli | Feb. 13, 1912 |
| 2,621,129 | Ramsbottom et al. | Dec. 9, 1952 |
| 2,623,826 | Grinstead | Dec. 30, 1952 |

OTHER REFERENCES

"Food Industries," September 1949, pp. 37, 38, 190 and 192, article entitled How Nitrogen Protects the Quality of Foods.